United States Patent [19]

Parton

[11] Patent Number: 4,763,371
[45] Date of Patent: Aug. 16, 1988

[54] COLORATION PROCESS FOR APPLYING A COLORED POLYMER CONTAINING UNITS DERIVED FROM AN ORGANIC DYE

[75] Inventor: Brian Parton, Bury, United Kingdom

[73] Assignee: Imperial Chemical Industries PLC, London, England

[21] Appl. No.: 870,544

[22] Filed: Jun. 4, 1986

[30] Foreign Application Priority Data

Jun. 12, 1985 [GB] United Kingdom ............ 8514905

[51] Int. Cl.[4] ................................................ C09B 69/10
[52] U.S. Cl. ............................................. 8/647; 8/532; 8/555; 8/918
[58] Field of Search ......................................... 8/647

[56] References Cited

U.S. PATENT DOCUMENTS

| 3,232,691 | 2/1966 | Wilhelm et al. | 8/647 |
|---|---|---|---|
| 3,344,098 | 9/1967 | Horiguchi et al. | 8/647 |
| 3,503,087 | 3/1970 | Wolf et al. | 8/553 |
| 3,627,472 | 12/1971 | Parsons et al. | 8/647 |
| 4,101,269 | 7/1978 | Champenois | 8/647 |
| 4,132,841 | 1/1979 | Champenois | 8/647 |

FOREIGN PATENT DOCUMENTS

| 698813 | 11/1967 | Belgium . |
| 205290 | 12/1986 | European Pat. Off. . |
| 1047554 | 11/1966 | United Kingdom . |
| 1098916 | 1/1968 | United Kingdom . |

*Primary Examiner*—A. Lionel Clingman
*Attorney, Agent, or Firm*—Cushman, Darby & Cushman

[57] ABSTRACT

A method for the coloration of textile materials which comprises applying thereto by a printing or continuous dyeing technique a colored polymer containing repeat units derived from at least one organic dye containing two or more polymerizable olefinically unsaturated groups.

10 Claims, No Drawings

COLORATION PROCESS FOR APPLYING A COLORED POLYMER CONTAINING UNITS DERIVED FROM AN ORGANIC DYE

This invention relates to a coloration process and especially to a process for the printing or continuous dyeing of textiles using coloured polymers.

Dyes containing vinyl, acryloyl and other polymerisable olefinic groups are already known and methods have been proposed for their homopolymerisation and for their copolymerisation with other polymerisable monomers both in the presence and absence of textile or other substrates.

Thus, United Kingdom Patent Specification No. 877402 describes the production of coloured polymers, useful as pigments, by copolymerising azo or anthraquinone dyes containing polymerisable olefinic groups with other unsaturated polymerisable compounds.

United Kingdom Patent Specification No. 914354 describes a process for the simultaneous dyeing and finishing of textiles by applying a coloured polymer which has been obtained by the emulsion copolymerisation of a dye containing a polymerisable olefinic group and an uncoloured polymerisable compound, the applied copolymer then being cross-linked.

United Kingdom Patent Specification No. 1036700 describes organic pigments obtained by the homopolymerisation of 1-methacryloylaminoanthraquinone, 1-p-vinylbenzoylaminoanthraquinone and certain derivatives thereof.

Other patents, for example United Kingdom Patent Nos. 1046751 and 1218547, have described the application of polymerisable dyes containing olefinic groups to textile materials in conjunction with a free radical polymerisation initiator with the object of polymerising the dye on or within the textile fibres.

Other references to the synthesis, properties and uses of polymeric dyes may be found in a review article by Marechal (Progress in Organic Coatings, 10 (1928) 251–287).

None of the processes described in the above documents appears to have achieved commercial importance, presumably because they did not provide colorations having the intensities and fastness properties that could be obtained more economically by other methods.

It has now been found that coloured polymers obtained by polymerising dyes containing two or more polymerisable groups are extremely useful in textile printing and continuous dyeing processes.

Accordingly, the invention provides a method for the coloration of textile materials which comprises applying thereto by a printing or continuous dyeing technique a coloured polymer containing repeat units derived from at least one organic dye containing two or more polymerisable olefinically unsaturated groups.

The polymerisable olefinically unsaturated groups present in the dyes are groups which render the dyes homopolymerisable or copolymerisable with other olefinic (vinyl) monomers under the standard polymerisation conditions. As examples of such groups, there may be mentioned groups of the general formula:

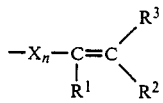  (1)

wherein X represents an atom or group linking the olefinic group to a carbon atom present in the dye molecule, n has the value 0 or 1 and each of $R^1$, $R^2$ and $R^3$ independently represents a hydrogen or halogen atom or a hydroxyl, optionally substituted alkyl, optionally substituted alkoxy, optionally substituted alkylthio, cycloalkyl, optionally substituted aryl, optionally substituted aryloxy, optionally substituted arylthio, nitro, cyano, acyloxy or alkoxycarbonyl group.

Alkyl groups mentioned herein, either as such or as components of larger groups such as alkoxycarbonyl, particularly include lower alkyl groups having one to four carbon atoms.

The preferred polymerisable groups are those in which each of $R^2$ and $R^3$ is hydrogen and $R^1$ is hydrogen, halogen, lower alkyl, cyano or alkoxycarbonyl. Especially preferred groups are those in which each of $R^2$ and $R^3$ is hydrogen and $R^1$ is hydrogen, halogen (especially chlorine) or lower alkyl (especially methyl).

As examples of linkages which may be represented by X in the formula:

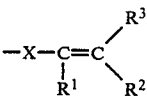  (2)

there may be mentioned $-O-$, $-S-$, $-CO-$, $-CS-$, $-NR^4-CO-$ in which $R^4$ is hydrogen or alkyl, $-O-CO-$, $-S-CO-$, $-CO-O-$, $-CO-S-$, $-SO-$, $-SO_2-$, $-NR^4-SO_2-$, $-SO_2-NR^4-$, $-CH_2-$, $-O-CH_2-$, $-S-CH_2-$, $-SO_2-CH_2-$, $-COCH_2-$, $-O-CO-CH_2-$, $-NR^4-CH_2-$ and $-NR^4-$.

As examples of especially preferred polymerisable groups there may be mentioned groups of the formula:

  (3)

in which $R^5$ represents hydrogen or lower alkyl, especially methyl.

It is preferred that the dyes contain two polymerisable groups, although dyes containing a higher number of polymerisable groups, for example five, may be used.

The dye or dyes from which the coloured polymers are derived may belong to any of the classes of organic dyes. As examples of chemical classes, there may be mentioned azo, which may be monoazo or polyazo, anthraquinone, phthalocyanine, triarylmethane, methine, nitro, oxazine including triphenodioxazine, diazahemicyanine, quinophthalone, benzodifuranone and indigoid.

The dyes may be water-soluble due to the presence of solubilising groups such as sulpho, carboxy and quaternary ammonium groups but they are preferably free of such substituents. Other substituents, conventional to organic dye molecules may be present and these include chlorine and bromine atoms and nitro, cyano, hydroxy, optionally substituted amino, optionally substituted alkyl, alkoxy, optionally substituted aryl, alkylsulphonyl, arylsulphonyl, optionally substituted carbamoyl, optionally substituted sulphamoyl, trifluoromethyl, acylamino, acyloxy, alkylcarbonyl and alkoxycarbonyl groups. Where appropriate, as in phthalocyanine and certain azo structures, the dye molecule may contain a co-ordinately bound metal atom such as copper, chromium or cobalt.

Azo dyes from which the coloured polymers may be derived include those of the formula:

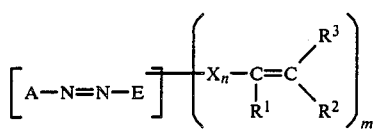
(4)

wherein A represents the residue of a carbocyclic or heterocyclic diazotisable amine containing at least one electron-withdrawing substituent, E represents the residue of a carbocyclic or heterocyclic coupling component, m is an integer of at least 2, and $R^1$, $R^2$, $R^3$, X and n have the meanings given above.

As examples of carbocyclic radicals which may be represented by A, there may be mentioned naphthyl and, especially, phenyl radicals. Heterocyclic radicals which may be represented by A include
2-thienyl,
3- or 4-pyrazolyl,
2- or 5-imidazolyl,
3-(1,2,4-triazolyl),
5-(1,2,3,4-tetrazolyl),
2-(1,3,4-thiadiazolyl),
3- or 5-(1,2,4-thiadiazolyl),
4- or 5-(1,2,3-thiadiazolyl),
3-, 4- or 5-isothiazolyl,
3-pyridyl,
2-benzoxazolyl,
3-thienyl-[2,3-b]-pyridine,
3-isothiazolyl-[3,4-d]-pyrimidine,
3-isothiazolyl-[3,4-b]-pyridine,
3-isothiazolyl-[3,4-b]-thiophene,
2-thiazolyl,
2-benzthiazolyl,
indazol-3-yl,
pyrazolopyridin-3-yl, and benz-2,1-isothiazol-3-yl radicals.

As examples of electron-withdrawing (electron-attracting) substituents which may be present on A, there may be mentioned chloro, bromo, fluoro, nitro, cyano, thiocyanato, trifluoromethyl, alkylcarbonyl (e.g. acetyl), alkylsulphonyl (e.g. methylsulphonyl), alkoxycarbonyl (e.g. methoxycarbonyl, ethoxycarbonyl), arylcarbonyl (e.g. benzoyl), arylsulphonyl (e.g. phenylsulphonyl), carbamoyl, alkylcarbamoyl (e.g. methylcarbamoyl), dialkylcarbamoyl (e.g. diethylcarbamoyl), arylcarbamoyl, diarylcarbamoyl, sulphamoyl, alkylsulphamoyl (e.g. ethylsulphamoyl), dialkylsulphamoyl (e.g. dimethylsulphamoyl), arylsulphamoyl, diarylsulphamoyl and arylazo. For improved light fastness, it is preferred that A does not carry a nitro group when E is carbocyclic and when both A and E are carbocyclic, it is preferred that A does not contain nitro or chloro unless another different electron-withdrawing group is also present.

In addition to carrying one or more electron-withdrawing substituent, the residue represented by A may carry one or more substituents which are not electron-withdrawing in character. Examples of such substituents include hydroxyl, alkyl (e.g. methyl, butyl), alkoxy (e.g. methoxy) and acylamino (e.g. acetylamino) radicals.

The residue of the coupling component represented by E may be the residue of any of the carbocyclic or heterocyclic coupling components, that is to say compounds which couple with diazo compounds to form azo dyes. Examples of such coupling components include members of the phenol, naphthol, arylamine, pyrazolone, aminopyrazole, 2,6-diaminopyridine, 2,6-dihydroxypyridine and aminopyrimidine series. Any of the substituents appropriate to coupling components may be present.

Anthraquinone dyes from which the coloured polymers may be derived particularly include derivatives of 1,4-, 1,5- and 1,8-diaminoanthraquinone.

The polymers may be prepared by polymerising at least one organic dye containing two or more polymerisable olefinically unsaturated groups. The polymerisation may be carried out using any of the appropriate conventional methods. Thus, bulk, solution, emulsion or suspension techniques may be used with the usual polymerisation initiators and, where necessary, emulsifiers and/or protective colloids. To obtain the polymers in solid particulate form, it is convenient to carry out the polymerisation in an organic solvent using a suitably soluble initiator such as azodiisobutyronitrile and isolate the copolymer by precipitation and filtration. Polymers can be obtained in a convenient stable dispersion (latex) form using emulsion polymerisation techniques and, for example, a persulphate as initiator.

Especially useful coloured polymers for use in the method of the invention may be prepared by copolymerising at least one organic dye containing two or more polymerisable olefinically unsaturated groups and at least one uncoloured polymerisable olefin. The copolymerisation may be carried out using the conventional methods described above to give copolymers containing repeat units derived from the organic dye and from the uncoloured olefin. The copolymers suitably contain at least 0.5% and preferably from 2 to 10% on a weight basis of unit derived from the organic dye.

Examples of uncoloured polymerisable olefins which may be used in preparing the coloured polymers include vinyl aromatic compounds, for example, styrene, alpha-methylstyrene and vinyl toluene, alpha-beta-unsaturated carboxylic acids, for example acrylic and methacrylic acids and the nitriles, amides and esters thereof, for example, acrylonitrile, methyl methacrylate, butyl methacrylate, glycidyl methacrylate, acrylamide and N-methylolacrylamide, vinyl esters, for example vinyl acetate, vinyl chloride, vinylidene chloride, vinyl carbazole and vinyl ketones. Methacrylic acid esters such as methyl methacrylate are preferred.

Dyes containing two or more polymerisable olefinically unsaturated groups are known in the art and may be prepared by introducing polymerisable groups into a dye or into one or more of the intermediates therefor, for example the diazotisable amine and/or the coupling component in the case of an azo dye. In one method of introduction, a dye or intermediate containing an appropriate functional group is reacted with a compound containing a polymerisable olefinic group and a functional group which is reactive towards the aforementioned functional group.

The coloured polymers are particularly useful in the form of latices containing from 20 to 50% by weight of the polymer. An especially useful latex contains from 20 to 50% by weight of a copolymer containing from 2 to 10% by weight of units derived from an organic dye having at least two methacryloyl groups and from 98 to 90% by weight of units derived from a mixture of co-monomers consisting of methyl methacrylate and an N-methylolarylamide derivative which latter comprises from 0.1 to 5.0%, preferably from 0.5 to 2.0%, by weight of the co-monomer mixture. The dye preferably contains two methacryloyloxy groups and the N-methylolacrylamide derivative is especially N-methylolacrylamide itself.

Textile materials which may be coloured by the method of the invention include both natural and artificial textile materials, for example textile materials comprising natural cellulose fibres, for example cotton, flax, jute, hemp, sisal and ramie, regenerated cellulose fibres, for example viscose rayon and cuprammonium rayon, cellulose ester fibres, for example cellulose acetate and cellulose triacetate, natural protein fibres, for example wool, silk and mohair, regenerated protein fibres, synthetic polyamide fibres, for example nylon 66 and nylon 6, modified synthetic polyamide fibres, aromatic polyester fibres, for example polyethylene terephthalate, modified polyester fibres, polyacrylonitrile fibres, modified polyacrylonitrile fibres, polyurethane fibres and polyolefin fibres, for example polypropylene and fibres based on other synthetic polymers and copolymers, for example fibres based on copolymers of vinylidene dinitrile and vinyl esters, and blends of the above fibres. The method is of particular value for the coloration of cotton, polyester and polyester/cotton blends.

In a printing process, the coloured polymer, optionally in the form of an aqueous dispersion or latex, may be incorporated into a print paste together with other usual ingredients thereof, the print paste being applied to the textile material in conventional manner. The print pastes may also contain cross-linking agents, binders and catalysts. The resulting prints are superior to those obtained by conventional pigment printing processes in respect of brightness of shade, colour value, fastness to rubbing, fastness to solvents and transparency over pigment black giving sharper lines. The polymers can be used in conjunction with pigments in a conventional pigment printing recipe. Relative to printing processes using disperse or reactive dyes, the method of the invention has the advantage that it is not necessary to wash off or clear after fixation.

In a continuous dyeing process, the coloured polymer is incorporated into a padding liquor together with other usual ingredients thereof, the liquor being applied to the textile material in conventional manner. The padding liquor can contain cross-linking agents, binders and catalysts. The resultant dyeings are bright, have excellent fastness properties and do not require a subsequent clearing process.

The invention is illustrated but not limited by the following Examples in which all parts are by weight.

EXAMPLE 1

1.0 part of 4,6-bis-(beta-acryloyloxyethylamino)-2-ethyl-5-(4-nitrophenylazo)pyrimidine is dissolved in 50 parts of methyl methacrylate then added with rapid stirring to a solution of 1.2 parts of the sodium salt of lauryl ether sulphonic acid and 0.4 parts of an ethoxylated $C_{13}$–$C_{15}$ aliphatic alcohol in 20 parts of water to give a coarse emulsion. This coarse emulsion is treated with 4.6 parts of 4% aqueous potassium persulphate then added portionwise over 15 minutes to a solution of 3.5 parts of 4% aqueous potassium persulphate and 0.3 parts of the sodium salt of lauryl ether sulphonate in 33 parts of water at 88°–90° C. After stirring at 88°–90° for a further 10 minutes the mixture is cooled to room temperature, screened then applied to polyester and cotton using conventional printing and continuous dyeing techniques to yield a golden yellow shade of excellent fastness to light, heat and wet treatments. When applied to cotton in the presence of a butyl acrylate based polymeric binder system excellent fastness to wet and dry rubbing is also obtained.

The following table gives further Examples of products obtained in a similar way to the product of Example 1. Column 2 indicates the dyestuff monomer used, Column 3 the colourless co-monomer and Column 4 the colour of the final print.

| Example | Dyestuff Monomer | Colourless Co-Monomer | Shade on Cotton |
|---|---|---|---|
| 2 | 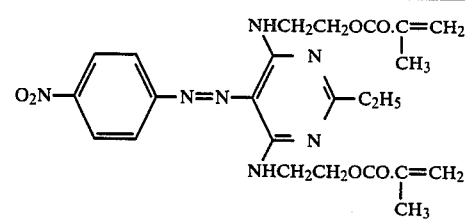 | Methyl methacrylate | Golden yellow |
| 3 | 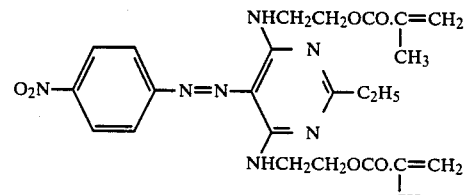 | Ethyl methacrylate | Golden yellow |

-continued

| Example | Dyestuff Monomer | Colourless Co-Monomer | Shade on Cotton |
|---|---|---|---|
| 4 | 3-methyl-4-cyano-5-[(2-methyl-4-(N,N-bis(2-acryloyloxyethyl)amino)phenyl)azo]isothiazole | Methyl methacrylate | Bluish-red |
| 5 | 3-cyanomethyl-4-cyano-5-[(2-methyl-4-(N,N-bis(2-acryloyloxyethyl)amino)phenyl)azo]-1-methylpyrazole | Methyl methacrylate | Orange |
| 6 | 3-methyl-4-cyano-5-[(2-methyl-4-(N,N-bis(2-acryloyloxyethyl)amino)phenyl)azo]-2-cyanothiophene | Methyl methacrylate | Violet |
| 7 | dicyanoimidazole-azo-(2-methyl-4-(N,N-bis(2-methacryloyloxyethyl)amino)phenyl), N-methyl | Methyl methacrylate | Bluish-red |
| 8 | 2-chloro-4-cyano-6-cyano-phenyl-azo-(2-methyl-4-(N,N-bis(2-acryloyloxyethyl)amino)phenyl) | Methyl methacrylate | Orange |
| 9 | 2,6-dicyano-3,5-dimethyl-phenyl-azo-(2-methyl-4-(N,N-bis(2-acryloyloxyethyl)amino)phenyl) | Methyl methacrylate | Reddish-orange |
| 10 | 2,6-dicyano-3,5-dimethyl-phenyl-azo-(2-acetamido-4-(N,N-bis(2-acryloyloxyethyl)amino)phenyl) | Methyl methacrylate | Blusih-red |
| 11 | 4-nitrophenylazo-pyridine derivative with two NHCH$_2$CH$_2$OCOCH=CH$_2$ groups and CN | Methyl methacrylate | Orange |

Table 2 describes further Examples of coloured copolymers prepared by the method of Example 1. In the table, the second and third columns respectively describe the diazo and coupling components used to make the azo dye. The third column gives the colourless co-monomer and the final column indicates the colour of the printed cotton.

TABLE 2

| Example | Diazo Component | Coupling Component | Colourless co-monomer | Shade on cotton |
|---|---|---|---|---|
| 12 | 4-nitroaniline | 4,6-bis-[(2-acryloyloxy-1-ethyl)ethylamino]-2-ethylpyrimidine. | methyl methacrylate (mm) | Golden yellow |
| 13 | 4-nitroaniline | 4,6-bis-[(2-acryloyloxy-1-ethyl(ethylamino]-2-ethylpyrimidine. | mm/acrylic acid | Golden yellow |
| 14 | 4-nitroaniline | 4,6-bis-[(2-acryloyloxy-1-ethyl)ethylamino]-2-ethylpyrimidine. | mm/butyl acrylate | Golden yellow |
| 15 | 4-nitroaniline | 4,6-bis-[(2-acryloyloxy-1-ethyl)ethylamino]-2-ethylpyrimidine. | 2-ethyl hexyl methacrylate | Golden yellow |
| 16 | 4-nitroaniline | 4,6-bis-[(2-acryloyloxy-1-ethyl)ethylamino]-2-ethylpyrimidine. | dodecyl methacrylate | Golden yellow |
| 17 | 4-(1,1-bis-acryloyloxy-methylpropoxy-carbonyl)aniline | 1-ethyl-5-cyano-4-methyl-6-hydroxypyrid-2-one | mm | Greenish yellow |
| 18 | 3,4-dicyanoaniline | 3-methyl-N,N—bis-acryloyloxyethyl-aniline | mm | Orange |
| 19 | 2-cyano-4-nitroaniline | 3-methyl-N,N—bis-acryloyloxyethyl-aniline | mm | Bluish red |
| 20 | 2-chloro-4-nitroaniline | 3-methyl-N,N—bis-acryloyloxyethyl-aniline | mm | Red |
| 21 | 4-chloro-2,6-dicyanoaniline | 3-methyl-N,N—bis-acryloyloxyethyl-aniline | mm | Red |
| 22 | 2,6-dicyano-4-methylaniline | 3-methyl-N,N—bis-acryloyloxyethyl-aniline | mm | Red |
| 23 | 4-chloro-2-nitroaniline | 3-methyl-N,N—bis-acryloyloxyethyl-aniline | mm | Red |
| 24 | 2-chloro-6-cyano-4-nitroaniline | 3-acetylamino-N,N—bis-acryloyloxy-ethylaniline | mm | Blue |
| 25 | 2-chloro-4-nitroaniline | N,N—bis-acryloyl-oxyethylaniline | mm | Orange |
| 26 | 4-(N,N—bis-2-acryloyloxy-ethylsulphamoyl)-2-nitroaniline | 2-naphthol | mm | Orange |
| 27 | 4-(N,N—bis-2-acryloyloxy-ethylsulphamoyl)-2,6-dichloroaniline | N,N—bis-acryloyl-oxyethylaniline | mm | Golden yellow |
| 28 | 2,3,5-trichloro 6-cyanoaniline | 3-methyl-N,N—bis-acryloyloxyethyl-aniline | mm | Orange |
| 29 | 5-amino-4-cyano-1,3-dimethyl pyrazole | N—acryloyloxy-ethyl-N—cyanoethyl-3-acrylamidoaniline | mm | Golden yellow |
| 30 | 3-chloro-4-cyanoaniline | 3-methyl-N,N—bis acryloyloxyethyl-aniline | mm | Orange |
| 31 | 4-aminoazobenzene | 3-methyl-N,N—bis acryloyloxyethyl-aniline | mm | Orange |
| 32 | 3,5-dicyanoaniline | 3-methyl-N,N—bis acryloyloxyethyl-aniline | mm | Orange |

The following Table 3 represents polymerised dye emulsions obtained in a similar fashion by using the coupling component of Example 35 and the diazo component described in the second column. The colourless co-monomer is again described in column three and the shade imparted to cotton is shown in the final column.

TABLE 3

| Example | Diazo Component | Colourless co-monomer | Shade on cotton |
|---|---|---|---|
| 33 | 2,5-dichloro-4-cyanoaniline | mm | Orange |
| 34 | 2,6-dicyano-4-ethoxycarbonyl-3-methylaniline | mm | Bluish red |
| 35 | 3-amino-5-cyano-6-methylisothiazolo[3,4:b]pyridine | mm | Blue |
| 36 | 2-amino-6-thiocyanatobenzthiazole | mm | Red |
| 37 | 2-amino-5-chloro-1,3-thiadiazole | mm | Scarlet |
| 38 | 4-ethylsulphamoylaniline | mm | Golden yellow |
| 39 | 4-methoxycarbonylaniline | mm | Golden yellow |
| 40 | 4-butoxycarbonylaniline | mm | Golden yellow |
| 41 | 4-methylsulphonylaniline | mm | Orange |
| 42 | 2-cyano-4-methoxycarbonylaniline | mm | Red |
| 43 | 2-chloro-6-cyano-4-methoxycarbonylaniline | mm | Red |
| 44 | 2,6-dicyano-4-methoxycarbonylaniline | mm | Violet |
| 45 | 2-amino-3-cyano-5-phenylazothiophene | mm | Blue |
| 46 | 2-chloro-5-nitroaniline | mm | Yellow |
| 47 | 4-bromo-2,6-dicyanoaniline | mm | Red |
| 48 | 2-amino-3-cyano-4-ethoxycarbonylaniline | mm | Red |
| 49 | 5-amino-3-cyanomethyl-4-ethoxycarbonyl-1-methylpyrazole | mm | Orange |
| 50 | 5-amino-3-phenyl-1,2,4-thiadiazole | mm | Red |
| 51 | 5-amino-3-methylthio-1,2,4-thiadiazole | mm | Red |
| 52 | 5-amino-4-nitro-3-methyl-isothiazole | mm | Reddish blue |
| 53 | 5-amino-3-bromo-4-acetyl-isothiazole | mm | Red |
| 54 | 6-amino-2-methylthio-isothiazolo[4,5:d]thiazole | mm | Red |
| 55 | 3-amino-4-methyl-5-methylthio-isothiazole | mm | Golden yellow |
| 56 | 4-amino-3,5-bis-ethoxycarbonyl-isothiazole | mm | Scarlet |
| 57 | 2-amino-4-chloro-5-formylthiazole | mm | Violet |
| 58 | 5-amino-4-cyano-3-methylsulphonyl-isothiazole | mm | Bluish red |
| 59 | 5-amino-4-cyano-3-ethylsulphonyl-isothiazole | mm | Bluish red |
| 60 | 3-amino-2,4,6-trichloropyridine | mm | Orange |
| 61 | 2-amino-4,5-dicyanothiazole | mm | Reddish blue |
| 62 | 2-amino-6-cyanobenzthiazole | mm | Bluish red |
| 63 | 3-amino-5,7-dicyano-2,1-benzisothiazole | mm | Blue |
| 64 | 2-cyano-3,5-bistrifluoromethyl-aniline | mm | Red |

Similar dyes are prepared by using the coupling component of Example 1 with the diazo components indicated in Table 4. The shades obtained on cotton are indicated in the final column of the table. All of the co-polymerised dyes are made using the quantities described in Example 1.

TABLE 4

| Example | Diazo Component | Colourless co-monomer | Shade on cotton |
|---|---|---|---|
| 65 | 2-chloro-4-nitroaniline | mm | Orange |
| 66 | 2-cyano-4-nitroaniline | mm | Reddish orange |
| 67 | 2-bromo-6-cyano-4-nitroaniline | mm | Yellow red |
| 68 | 2,6-dicyano-4-nitroaniline | mm | Scarlet |
| 69 | 4-ethylsulphamoylaniline | mm | Yellow |
| 70 | 3,4-dicyanoaniline | mm | Golden yellow |
| 71 | 4-nitroaniline | mm/N—methylol acrylamide | Golden yellow |
| 72 | 2-chloro-5-nitroaniline | mm | Yellow |
| 73 | 4-methoxycarbonylaniline | mm | Mid-yellow |
| 74 | 2,6-dichloro-4-ethyl-sulphamoylaniline | mm | Yellow |
| 75 | 2-bromo-6-cyano-4-methoxycarbonylaniline | mm | Orange |
| 76 | 5-amino-4-cyano-3-methyl-isothiazole | mm | Scarlet |
| 77 | 4-methylsulphonylaniline | mm | Yellow |
| 78 | 2-amino-3-cyano-5-phenylazothiophene | mm | Scarlet |
| 79 | 2,6-dicyano-4-methylaniline | mm | Orange |
| 80 | 2,6-dicyano-4-methoxycarbonylaniline | mm | Scarlet |
| 81 | 2-cyano-5-nitroaniline | mm | Scarlet |
| 82 | 2-methoxycarbonyl-4-nitroaniline | mm | Scarlet |

EXAMPLE 83

A preparation is conducted in exactly the same way as in Example 1 except that 3.0 parts of the same dyestuff monomer is used in place of the 1.0 part of Example 1 to give a final print on cotton with good handle properties.

EXAMPLE 84

A further preparation is conducted as described in Example 86 except that 1 part of N-methylol acrylamide is additionally dissolved in the solution containing the surfactants (lauryl ether sulphonate and ethoxylated $C_{13}$-$C_{15}$ aliphatic alcohol). The final emulsion is applied to cotton in the presence of synthetic thickener alone and fixed by baking at 150°. The resultant print has good handle properties and fastness to scrubbing and rubbing.

Further examples are illustrated in the following Table 5. The diazo component is shown in the second column, the coupling component in the third column, the co-monomer in the fourth column and the shade imparted to cotton in the fifth column. The method of preparation is as described for Example 1.

TABLE 5

| Example | Diazo Component | Coupling Component | Colourless co-monomer | Shade on cotton |
|---|---|---|---|---|
| 85 | 2-chloro-4-nitroaniline | 1-[2,3-bis(acryloyloxy)prop-1-yl]-3-cyano-2-hydroxy-4-methylpyrid-6-one | mm | Greenish yellow |
| 86 | 2-chloro-4-nitroaniline | 1-[4-N:N—bis(2-acryloyloxyethyl)sulphamoyl]phenyl-5-hydroxy-4-methyl pyrazole | mm | Greenish yellow |
| 87 | 2-chloro-4-nitroaniline | 2-(N,N—bis-2-acryloyloxyethyl)-carbamoyl-3-naphthol | mm | Scarlet |

TABLE 5-continued

| Example | Diazo Component | Coupling Component | Colourless co-monomer | Shade on cotton |
|---|---|---|---|---|
| 88 | 2-chloro-4-nitroaniline | 4,6-bis-(2-acryloyloxyethyl-amino)-2-chloro-pyrimidine | mm | Golden yellow |
| 89 | 2-chloro-4-nitroaniline | 2,4,6-tris(2-acryloyloxyethyl-amino)-2-chloro-pyrimidine | mm | Orange |
| 90 | 2-chloro-4-nitroaniline | 4,6-bis(2-acryloyloxyethyl-amino)-2-thiomethyl pyrimidine | mm | Orange |
| 91 | 2-chloro-4-nitroaniline | 4,6-bis(2-acryloyloxyethyl-amino)-2-N,N-bis-ethylamino pyrimidine | mm | Scarlet |
| 92 | 2-chloro-4-nitroaniline | 5-(2,3-bis-acryloyloxy)prop-1-ylamino-1,3-dimethylpyrazole | mm | Golden yellow |
| 93 | 2-chloro-4-nitroaniline | 2,6-bis(2-acryloyloxyethyl-amino)-3-cyano-4-methylpyridine | mm | Orange |
| 94 | 2-chloro-4-nitroaniline | 2-chloro-N—(2,3-bis-acryloyloxy-prop-1-yl)aniline | mm | Golden yellow |
| 95 | 2-chloro-4-nitroaniline | 2-chloro-N—(2,3-bis-acryloyloxy-prop-1-yl)aniline | mm | Golden yellow |
| 96 | 4-nitroaniline | 2,4-bis-(2-acryloyloxyethyl-amino)-4-chloro-pyrimidine | mm | Golden yellow |
| 97 | 4-nitroaniline | 2,4,6-tris-(2-acryloyloxyethyl-amino)-pyrimidine | mm | Golden yellow |
| 98 | 4-nitroaniline | 2,6-bis(2-acryloyloxyethyl-amino)-3-cyano-4-methylpyridine | mm | Orange |
| 99 | 4-nitroaniline | 1-[2,3-bis(acryloyl oxy)prop-1-yl]-3-cyano-2-hydroxy-4-methylpyrid-6-one | mm | Greenish yellow |
| 100 | 4-(N,N—bis-2-acryloyloxyethyl) sulphamoyl-2-chloroaniline | N,N,N'—tris(2-acryloxyethyl)-1,3-phenylene diamine | mm | Scarlet |
| 101 | 4-(N,N—bis-2-acryloyloxyethyl) sulphamoyl-2-chloroaniline | 5-acryloylamino-2-methoxyl-N,N—bis-2-acryloyloxy-ethylaniline | mm | Red |
| 102 | 4-(N,N—bis-2-acryloyloxyethyl) sulphamoyl-2-chloroaniline | N—(2-acryloyloxy-ethyl)-N—(2-cyano-ethyl)-3-methyl-aniline | mm/bis-acryloyl ethylene glycol | Orange |
| 103 | 4-aminostyrene | 1-(3-acryloyloxy-n-propyl)-3-cyano-2-hydroxy-4-methyl-pyrid-6-one | mm/bis-acryloyl ethylene glycol | Greenish yellow |
| 104 | 4-acryloyloxy-ethylamino sulphonylaniline | 1-(3-acryloyloxy-n-propyl)-3-cyano-2-hydroxy-4-methyl-pyrid-6-one | mm/bis-acryloyl ethylene glycol | Greenish yellow |
| 105 | 2-chloro-4-nitroaniline | N,N—bis-(2-acryloyloxyethyl) aniline | butyl methacrylate | Orange |
| 106 | 2-chloro-4-nitroaniline | 4,6-bis-(2-methacryloyloxy-ethylamino)-2-ethylpyrimidine | 2-ethyl hexyl methacrylate/ mm. 2/1 | Orange |
| 107 | 2-chloro-4-nitroaniline | 4,6-bis-(2-methacryloyloxy-ethylamino)-2-ethylpyrimidine | Styrene mm. 1/3 | Orange |
| 108 | 2-chloro-4-nitroaniline | 4,6-bis-(2-methacryloyloxy-ethylamino-2- | alpha-methyl styrene | Orange |

TABLE 5-continued

| Example | Diazo Component | Coupling Component | Colourless co-monomer | Shade on cotton |
|---|---|---|---|---|
| 109 | 2-chloro-4-nitroaniline | 4,6-bis-(2-methacryloyloxy-ethylamino-2-ethylpyrimidine | methacrylonitrile | Orange |
| 110 | 2-chloro-4-nitroaniline | 4,6-bis-(2-methacryloyloxy-ethylamino)-2-ethylpyrimidine | mm/ glycidyl methacrylate 4/1 | Orange |
| 111 | 2-chloro-4-nitroaniline | 4,6-bis-(2-methacryloyloxy-ethylamino)-2-ethylpyrimidine | vinyl acetate/ mm. 1/2 | Orange |
| 112 | 2-chloro-4-nitroaniline | 4,6-bis-(2-methacryloyloxy-ethylamino)-2-ethylpyrimidine | dodecyl methacrylate | Orange |
| 113 | 4-nitroaniline | 4,6-bis-(2-acryloyloxyethyl-amino)-2-ethyl-pyrimidine | mm | Orange |
| 114 | 4-nitroaniline | 4,6-bis-(2-methacryloyloxy-ethylamino)-2-ethylpyrimidine | mm | Orange |
| 115 | 2-cyano-4-nitroaniline | N,N—bis-[2-(2-carboxyacryloyl-oxy)ethyl]-3-methylaniline | mm | Bluish red |
| 116 | 4-nitroaniline | 4,6-bis-[2-(1-bromoacryloyl-oxy)ethylamino]-2-ethylpyrimidine | mm | Golden yellow |
| 117 | 4-nitroaniline | 4,6-bis-[2-(1-methoxyacryloyl-oxy)ethylamino]-2-ethylpyrimidine | mm | Golden yellow |

The Examples given below in Table 6 are emulsion co-polymers of methyl methacrylate.

TABLE 6

| Example | Dyestuff Monomer | Shade on cotton |
|---|---|---|
| 118 | 1,4-bis-(2-acryloyloxyethylamino)anthraquinone | Reddish blue |
| 119 | 1,4-bis-(2-acryloyloxy-1-ethylethylamino)anthraquinone | Reddish blue |
| 120 | 1,4-bis-[4-(2-acryloyloxyethoxy)phenylamino]anthraquinone | Green |
| 121 | 1,4-bis-(2-acryloyloxyethylamino)-5-hydroxy-8-nitroanthraquinone | Turquoise |
| 122 | 1,5-bis-(2-acryloyloxyethylamino)anthraquinone | Red |
| 123 | 2-(4-acryloyloxyphenyl)-4-acryloylamino-1-aminoanthraquinone | Red |
| 124 | 1,4-bis-(4-acryloyloxymethyl-2,6-dimethylanilino)anthraquinone | Reddish blue |
| 125 | 1-[2-(1,1-acryloyloxymethyl)propoxycarbonylethylamino]-4-amino-8-hydroxy-5-nitroanthraquinone | Turquoise |
| 126 | 1,8-bis-(2-acryloyloxyethylamino)-4,6-dihydroxyanthraquinone | Greenish blue |
| 127 | 1,4-bis-(2-acryloyloxyethylamino)-5,8-dihydroxyanthraquinone | Greenish blue |
| 128 | 1,5-bis-(2-acryloyloxyethylamino)-4,8-dihydroxyanthraquinone | Greenish blue |
| 129 | 1,8-bis-(2-acryloyloxyethylamino)anthraquinone | Red |
| 130 | 4-acryloylamino-2-(2-acryloyloxyethoxy)-1-aminoanthraquinone | Red |
| 131 | 1,5-bis-(2-acryloyloxyethylamino)naphtha-4,8-diquinone | Blue |
| 132 | 1,5-bis-(2-acryloyloxyethylamino)dibromonaphtha-4,8-diquinone | Greenish blue |
| 133 | 2-[4-N:N—bis-(2-acryloyloxyethylamino)phenyl]-6-methoxy-3-methylbenzthiazoluine methosulphate | Blue |
| 134 | 3-[4-N:N—bis-(2-acryloyloxyethylamino)phenylazo]-2,4-dimethylthiazolium methosulphate | Red |
| 135 | (structure shown) | Yellow |
| 136 | Copper phthalocyanine-(SO$_3$H)$_2$(SO$_2$NCH$_2$CH$_2$OCOCH=CH$_2$)$_2$ | Turquoise |
| 137 | Copper phthalocyanine-(CH$_2$OCOCH=CH$_2$)$_3$ | Turquoise |
| 138 | 4-(2,2-bis-acryloyloxymethylethoxy)-N—(2,4-dinitrophenyl)aniline | Yellow |

TABLE 6-continued

| Example | Dyestuff Monomer | Shade on cotton |
|---|---|---|
| 139 | [structure: C₂H₅—C(CH₂OCOCH=CH₂)₂—O—CO—phenyl—N=N—(3-position of 4-hydroxy-2-oxo-1H-quinoline)] | Greenish yellow |
| 140 | [structure: C₂H₅—C(CH₂OCOCH=CH₂)₂—O—CO—O—(6-position of 4-bromo-3-hydroxy-2-(phthalidyl-CH)-quinoline)] | Mid-yellow |
| 141 | 1-[4-N:N—bis-(2-acryloyloxyethyl)aminophenyl]-2,2-dicyanoethylene | Greenish yellow |
| 142 | 3-[N:N—bis-(2-acryloyloxyethyl)carbamoyl]-1-(2-chloro-s-trifluoromethyl)phenylazo-2-hydroxynaphthalene | Orange |
| 143 | N:N—bis-(2-acryloyloxyethyl)-3-acetylamino-4-(2-chloro-4-methylsulphonyl)phenylazoaniline | Ornage |
| 144 | 2-[4-N:N—bis-(2-acryloyloxyethyl)amino-2-methylphenylazo-6-nitrobenzthiazole | Rubine |
| 145 | [structure: naphthalene fused to pyridine ring with OH, NH, and N—CH₂OCOCH=CH₂, COOC(C₂H₅)(CH₂OCOCH=CH₂)₂ substituents] | Red |
| 146 | 3-[N:N—bis-(2-acryloyloxyethyl)carbamyl]-1-(2-nitro)phenylazo-2-hydroxynaphthalene | Scarlet |
| 147 | 5-[4-N:N—bis-(2-acryloyloxyethyl)aminophenylazo]-3-2-[(1,1-bis-acryloyloxymethyl)propoxycarbonyl]-ethylthio-1,2,4-thiadiazole | Pink |
| 148 | N,N—bis-(2-acryloyloxyethyl)-4-(2,6-dichloro-4-nitro)phenylazoaniline | Brown |
| 149 | [structure: bis-benzofuranone (thioindigo-like) dye with phenyl substituent and 4-(OCH₂C(=O)OC(C₂H₅)(CH₂OCOCH=CH₂)₂)phenyl group] | Scarlet |
| 150 | [structure: benzothiophene-SO₂ system with =CH—C₆H₄—N(CH₂CH₂OCOCH=CH₂) and =C(CN)₂ groups] | Violet |
| 151 | 2,9-bis-(2-acryloxyethylamino)-6,13-dichlorotriphendioxazine | Blue |

I claim:

1. A method for the coloration of cotton or polyester/cotton blend textile materials which comprises applying thereto by a printing or continuous dyeing technique a colored polymer containing repeat units derived from at least one organic dye which is free from water-solubilizing groups and contains two or more polymerizable olefinically unsaturated groups and from at least one uncolored polymerizable olefin.

2. A method according to claim 1 wherein the polymerisable olefinically unsaturated groups in the organic dye have the formula:

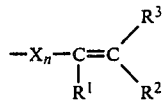

wherein X represents an atom or group linking the olefinic group to a carbon atom present in the dye molecule, n has the value 0 or 1 and each of $R^1$, $R^2$ and $R^3$ independently represents a hydrogen or halogen atom or a hydroxyl, optionally substituted alkyl, optionally substituted alkoxy, optionally substituted alkylthio, cycloalkyl, optionally substituted aryl, optionally substituted aryloxy, optionally substituted arylthio, nitro, cyano, acyloxy or alkoxycarbonyl group.

3. A method according to claim 2 wherein each of $R^2$ and $R^3$ is hydrogen and $R^1$ is hydrogen, halogen, lower alkyl, cyano or alkoxycarbonyl.

4. A method according to claim 3 wherein $R^1$ is methyl.

5. A method according to claim 2 wherein the polymerisable groups have the formula:

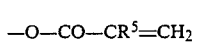

wherein $R^5$ is hydrogen or lower alkyl.

6. A method according to claim 5 wherein $R^5$ is methyl.

7. A method according to claim 1 wherein the dye contains two polymerisable olefinically unsaturated groups.

8. A method according to claim 2 wherein the organic dye is an azo dye having the formula:

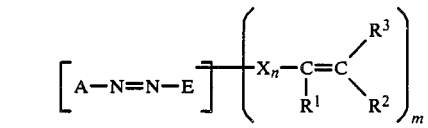

wherein A represents the residue of a carbocyclic or heterocyclic diazotisable amine containing at least one electron-withdrawing substituent, E represents the residue of a carbocyclic or heterocyclic coupling component, m is an integer of at least 2, and $R^1$, $R^2$, $R^3$, X and n have the meanings given in claim 2.

9. A method according to claim 1 wherein the coloured copolymer contains from 2 to 10% by weight of units derived from an organic dye.

10. A method according to claim 1 wherein the uncoloured polymerisable olefin is methyl methacrylate.

* * * * *